United States Patent [19]

Jäger

[11] Patent Number: 5,075,428

[45] Date of Patent: Dec. 24, 1991

[54] 2,4-DIAMINO-6-FLUOROTRIAZINE DISAZO REACTIVE DYESTUFFS

[75] Inventor: Horst Jäger, Leverkusen, Fed. Rep. of Germany

[73] Assignee: Bayer Aktiengesellschaft, Leverkusen, Fed. Rep. of Germany

[21] Appl. No.: 377,994

[22] Filed: Jul. 11, 1989

[30] Foreign Application Priority Data

Jul. 30, 1988 [DE] Fed. Rep. of Germany ....... 3826060
Oct. 1, 1988 [DE] Fed. Rep. of Germany ....... 3833380

[51] Int. Cl.$^5$ .................. C09B 62/09; C09B 31/08; D06P 1/382
[52] U.S. Cl. .................... 534/637; 534/583; 534/836
[58] Field of Search ............ 534/637, 638, 642, 836, 534/837

[56] References Cited

U.S. PATENT DOCUMENTS

| | | | |
|---|---|---|---|
| 593,347 | 11/1897 | Bender | 534/836 X |
| 2,722,527 | 11/1955 | Wehrli et al. | 534/836 X |
| 3,635,944 | 1/1972 | Litke | 534/836 |
| 4,002,424 | 1/1977 | Smith | 534/836 X |
| 4,019,858 | 4/1977 | Conger | 534/836 X |
| 4,645,832 | 2/1987 | Niwa et al. | 534/637 |
| 4,670,547 | 6/1987 | Lehr | 534/637 |

FOREIGN PATENT DOCUMENTS

| | | | |
|---|---|---|---|
| 61-200174 | 9/1986 | Japan | 534/637 |
| 61-272269 | 12/1986 | Japan | 534/637 |
| 62-84160 | 4/1987 | Japan | 534/637 |
| 10669 | of 1895 | United Kingdom | 534/836 X |

OTHER PUBLICATIONS

Hibara et al., *Chemical Abstracts*, vol. 106, No. 34632e (1987).

Hibara et al., *Chemical Abstracts*, vol. 107, No. 116954w (1987).

*Primary Examiner*—Mary C. Lee
*Assistant Examiner*—Fiona T. Powers
*Attorney, Agent, or Firm*—Sprung Horn Kramer & Woods

[57] ABSTRACT

A dyestuff of the formula

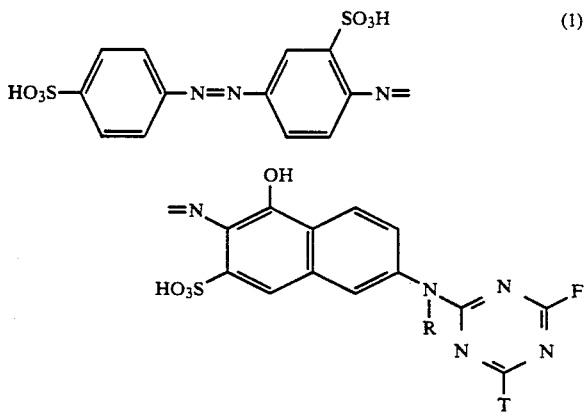

in which
R is H or CH$_3$

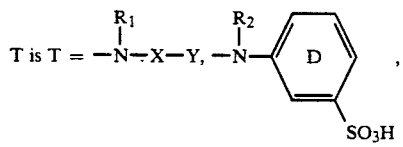

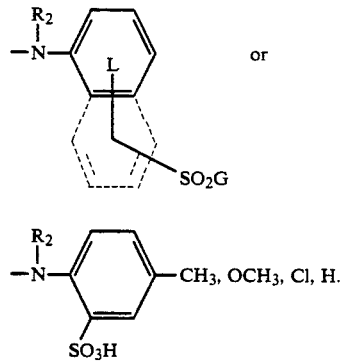

in which
R$_1$ is H, substituted or unsubstituted C$_1$-C$_4$-alkyl or —X—Y X is a divalent aliphatic, cycloaliphatic, aliphaticcycloaliphatic radical or an araliphatic radical Y is COOH, SO$_3$H, OSO$_3$H or SO$_2$G, in which G is CH=CH$_2$ or —CH$_2$—CH$_2$—Z, in which Z denotes a group which can be eliminated under alkaline conditions, R$_2$ is H or C$_1$-C$_4$-alkyl, and the benzene radical D and the benzene or naphthalene radical L can contain customary substituents, is suitable for the dyeing and printing of OH- and NH-containing materials. They produce lightfast and wet-fast brilliant dyeings and prints.

4 Claims, No Drawings

2,4-DIAMINO-6-FLUOROTRIAZINE DISAZO REACTIVE DYESTUFFS

The present invention relates to disazo reactive dyestuffs of the general formula

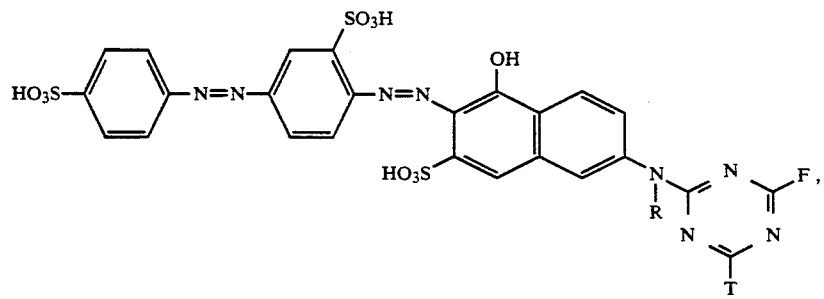

in which
R is H or $CH_3$

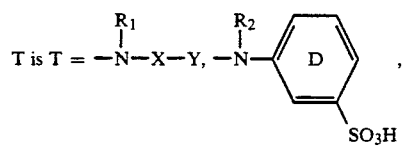

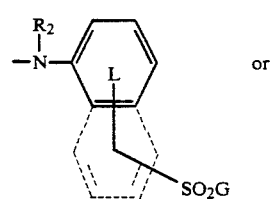

or

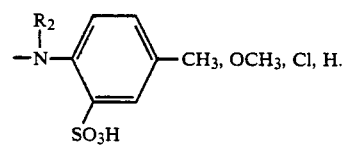

in which
$R_1$ is H, substituted or unsubstituted $C_1$-$C_4$-alkyl or —X—Y
X is a divalent aliphatic, cycloaliphatic, aliphatic-cycloaliphatic radical or an araliphatic radical
Y is COOH, $SO_3H$, $OSO_3H$ or $SO_2G$, in which
G is $CH=CH_2$ or —$CH_2$—$CH_2$—Z, in which Z denotes a group which can be eliminated under alkaline conditions,
$R_2$ is H or $C_1$-$C_4$-alkyl, and the benzene radical D and the benzene or naphthalene radical L can contain customary substituents.

The alkyl radical $R_1$ can be straight-chain or branched. Examples of substituents of $R_1$ are OH, $OCH_3$, $OC_2H_5$, Cl, CN. Examples of suitable radicals $R_1$ are —$CH_3$, —$C_2H_5$, —n—$C_3H_7$, —iso—$C_3H_7$, —$(CH_2)_2$—OH, —$(CH_2)_2$—Cl, —$(CH_2)_2$—CN.

The divalent radicals X can contain heteroatoms or heteroatom groupings, for example:

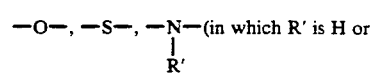

$C_1$-$C_4$-alkyl), —NHC—, —$SO_2$—.
                    ‖
                    O Examples of suitable radicals X are:

(1)

—$(CH_2)$—$_{1-6}$, —$CH_2$—CH—, —CH—$CH_2$—,
                        |          |
                       $CH_3$      $CH_3$

—$CH_2$—$CH_2$—O—$CH_2$—$CH_2$—,

—$CH_2$—$CH_2$—S—$CH_2$—$CH_2$—,

H
            |
—$CH_2$—$CH_2$—N—$CH_2$—$CH_2$—,

—$CH_2$—$CH_2$—$NHCOCH_2CH_2$—,

—$CH_2$—$CH_2$—NHCO—CH=CH—,

—$CH_2$—$CH_2$—$SO_2$—$CH_2$—$CH_2$—,

—$CH_2$—$CH_2$—O—$CH_2$—$CH_2$—$SO_2$—$CH_2$—$CH_2$—

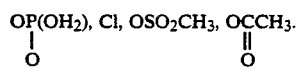

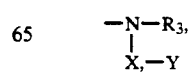

Examples of Z are $OSO_3H$, $S_2O_3H$, $OP(OH_2)$, Cl, $OSO_2CH_3$, OCCH$_3$.
  |                          ‖
  O                          O The following are examples of substituents of rings D and L:
Cl, Br, $CH_3$, $C_2H_5$, $OCH_3$, $OC_2H_5$, COOH, $SO_3H$, $NO_2$, $NH_2$, $NHCH_3$, $NHCH_2CH_2OH$, $NHCH_2CH_2OSO_3H$.

In the context of the formula (1), very generally those dyestuffs are preferred in which R and $R_2$ represent H and G represents —$CH=CH_2$ or —$CH_2OSO_3H$.

Those dyestuffs (1) are also preferred in which T is $T_1$, where T is

—N—$R_3$,
|
X,—Y in which $R_3$ is —H, —$C_1$-$C_4$-alkyl, —$X_1$—Y,
$X_1$ is a divalent aliphatic radical containing a maximum of 6 C atoms and which can contain —O—, —S—,

If Y is COOH, SO₃H, or OSO₃H,
X is preferably —CH₂—, —CH₂—CH₂—,

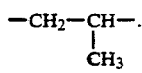

If Y is SO₂G, $X_1$ is preferably —CH₂—CH₂—, —CH₂—CH₂—O—CH₂—CH₂—.

The invention also relates to processes for the preparation of the dyestuffs of the formula (1).

1. A disazo dyestuff of the formula

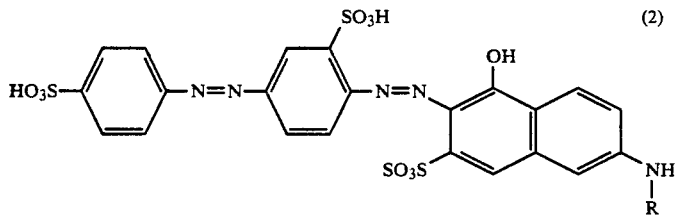

(2)

is first condensed with 2,4,6-trifluorotriazine with the elimination of hydrofluoric acid, and the resulting difluoro compound is reacted with an amine of the formula

H—T    (3)

with elimination of hydrofluoric acid to give a dyestuff of the formula (1).

2. An aminohydroxynaphthalenesulphonic acid of the formula (4)

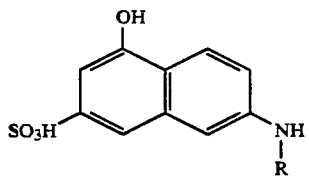

is condensed with 2,4,6-trifluorotriazine with elimination of hydrofluoric acid and the resulting difluoro compound is reacted with an amine of the formula (3).

The coupling component thus obtained of the formula

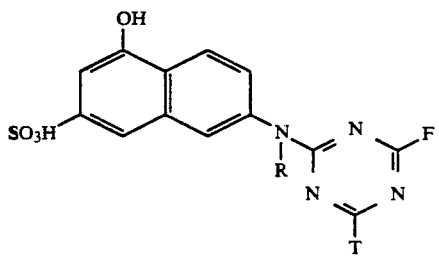

(5)

is coupled with the diazotized amine of the formula

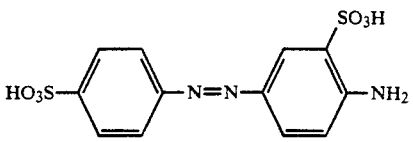

to give a dyestuff (1).

3. An amine of the formula (3) is condensed with 2,4,6-trifluorotriazine with elimination of hydrofluoric acid to give a difluoro compound of the formula (7)

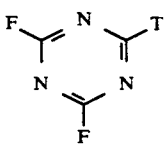

and this compound is reacted with a coupling component of the formula (4) to give a compound of the formula (5) with elimination of hydrofluoric acid, and this compound is then coupled with the diazo component (6).

The condensation of the compounds of the formula (2), (3) and (4) with 2,4,6-trifluorotriazine is preferably carried out in aqueous solution or suspension at low temperature and preferably at about 0° C. and at a weakly acidic, or neutral to weakly alkaline pH. The hydrogen fluoride which is liberated is neutralized by the addition of aqueous alkali metal hydroxides, alkali metal carbonates or alkali metal bicarbonates. The reaction of the difluoro compounds with the corresponding reactants also preferably takes place in aqueous solution or suspension at low temperature, preferably at 0° to 20° C., and at a weakly acidic to weakly alkaline pH.

The hydrogen fluoride which is liberated in the condensation of (2), (3) and (4) with trifluorotriazine is in general preferably trapped by Li bases, for example LiOH.

The dyestuffs of the formula (2) are obtained by coupling the diazotized amine of the formula (6) with the N-acylated coupling component of the formula (4) in a weakly acidic to weakly alkaline range. The acyl radical is subsequently eliminated by heating with acids or bases. Examples of an acyl radical are acetyl or carbamoyl.

Coupling components of the formula (4) are:
1-hydroxy-6-aminonaphthalene-3-sulphonic acid and
1-hydroxy-6-methylaminonaphthalene-3-sulphonic acid.

Examples of amines of the formula (3) are in the case where H—T is

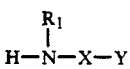

as follows:

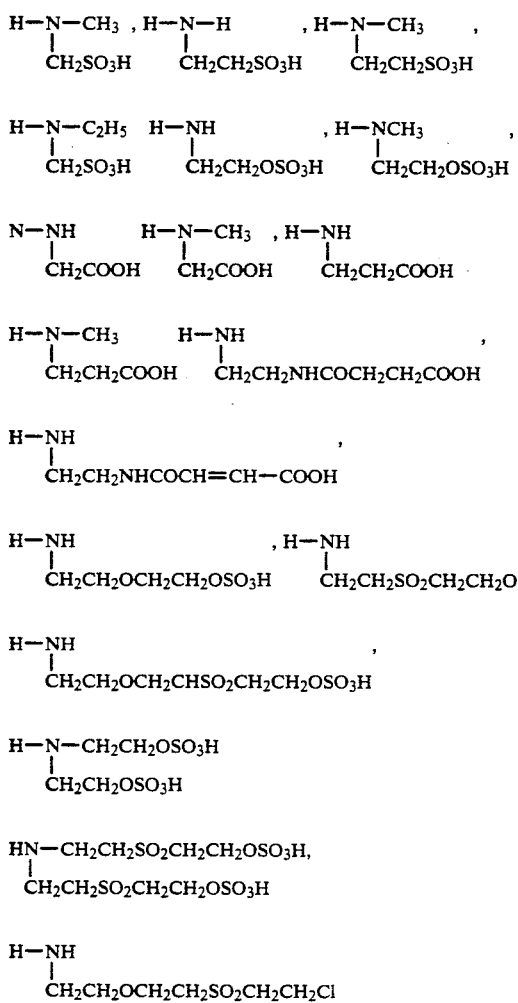

Examples of amines of the formula (3) are in the case where H—T is

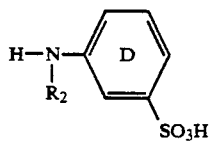

as follows:
1-aminobenzene-3-sulphonic acid
1-amino-4-chlorobenzene-3-sulphonic acid
1-amino-4-methylbenzene-3-sulphonic acid
1-amino-4-methoxybenzene-3-sulphonic acid
1-amino-4-ethoxybenzene-3-sulphonic acid
1-amino-2-methylbenzene-5-sulphonic acid
1-amino-2-chlorobenzene-5-sulphonic acid
1-amino-2-methoxybenzene-5-sulphonic acid
1-aminobenzene-2,5-disulphonic acid
1-amino-2,4-dimethoxybenzene-5-sulphonic acid
1-N-ethylaminobenzene-3-sulphonic acid.

Examples of amines (3) in the case where H—T is

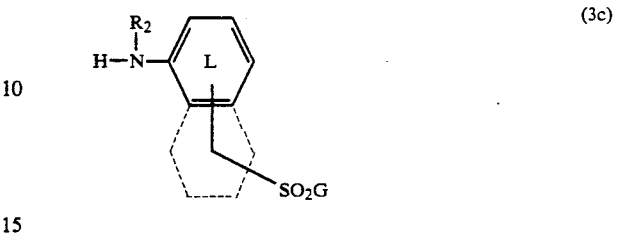

are as follows:
1-amino-2-phenyl, 1-amino-3-phenyl or amino-4-phenyl β-sulphatoethyl sulphone,
1-amino-3-phenyl β-phosphatoethyl sulphone, 1-amino-4-methyl-3-phenyl β-sulphatoethyl sulphone, 1-amino-3-phenyl β-chloroethyl sulphone, 1-amino-4-methoxy-3-phenyl β-sulphatoethyl sulphone,
1-amino-2-sulpho-4-phenyl β-sulphatoethyl sulphone,
1-amino-2-sulpho-5-phenyl β-sulphatoethyl sulphone,
1-amino-2,4-disulpho-5-phenyl β-sulphatoethyl sulphone,
1-amino-4-naphthyl β-sulphatoethyl sulphone,
1-amino-2,5-dimethoxy-4-phenyl β-sulphatoethyl sulphone,
1-amino-2-carboxy-4-phenyl β-sulphatoethyl sulphone,
1-amino-2-carboxy-5-phenyl β-sulphatoethyl sulphone,
1-amino-2-methoxy-4-phenyl β-sulphatoethyl sulphone,
1-amino-2-chloro-4-phenyl β-sulphatoethyl sulphone,
1-amino-2-methoxy-5-phenyl β-sulphatoethyl sulphone,
2-amino-8-naphthyl β-sulphatoethyl sulphone,
2-amino-6-sulpho-8-naphthyl β-sulphatoethyl sulphone,
1-amino-2,5-dimethoxy-4-phenyl vinyl sulphone,
1-amino-2-methoxy-5-methyl-4-phenyl β-sulphatoethyl sulphone,
1-amino-2,5-diethoxy-4-phenyl β-sulphatoethyl sulphone,
1-amino-2-bromo-4-phenyl β-sulphatoethyl sulphone,
1-amino-2-bromo-4-phenyl vinyl sulphone,
1-amino-2,4-disulpho-5-phenyl vinyl sulphone,
1-amino-2,4-disulpho-5-phenyl β-phosphatoethyl sulphone,
2-amino-6-sulpho-8-naphthyl β-phosphatoethyl- sulphone,
2-amino-6-sulpho-8-naphthyl vinyl sulphone,
1-amino-2-methoxy-5-methyl-4-phenyl β-chloroethyl sulphone,
2-amino-phenyl-4-phenyl β-sulphatoethyl sulphone,
1-amino-3-1-amino or amino-4-phenyl vinyl sulphone,
1-amino-2-hydroxy-4-phenyl β-sulphatoethyl sulphone,
1-amino-2-sulpho-5-phenyl vinyl sulphone,
2-amino-6,8-di(β-sulphatoethylsulphonyl)naphthalene,
2-amino-8-sulpho-6-naphthyl β-sulphatoethyl sulphone,
2-amino-4,8-di(β-sulphatoethylsulphonyl)naphthalene,
1-amino-3,4-di(β-sulphatoethylsulphonyl)benzene.

The invention also relates to the lithium salts of the formula

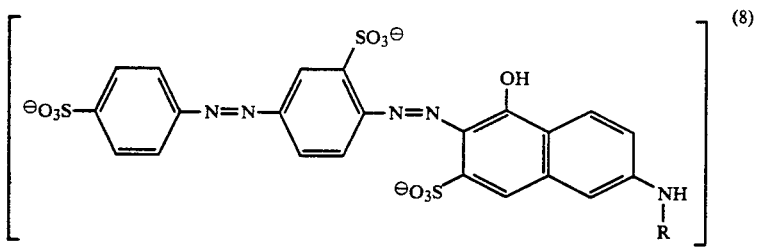

(8)

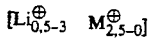

in which M⊕ is Na⊕ or K⊕, in which the sum of Li⊕+M⊕ is 3.

These cations M+ can be identical or different.

The salts of the formula (8) are obtained by reaction of the compounds

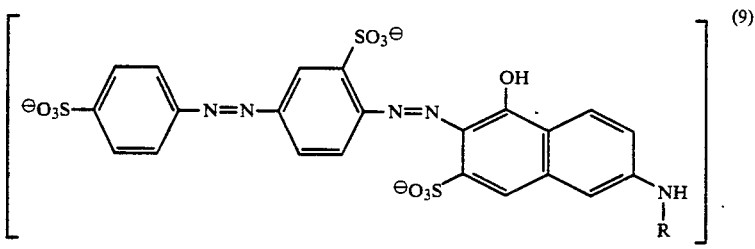

(9)

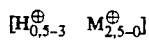

in which the sum H⊕+M⊕ is 3, with 0.5−3 equivalents of a lithium base.

The use of lithium salts (8) turns out to be particularly favourable for the acylation to give the reactive dyestuffs of the formula (1).

In the dyestuffs of the formula (8) and (9), R preferably denotes hydrogen.

The novel dyestuffs produce clear dyeings on cellulose and natural synthetic polyamide materials. They are distinguished by high colour strength.

The novel dyestuffs are of interest as water-soluble dyestuffs for dyeing textile materials containing hydroxyl and amide groups, in particular materials made of natural and regenerated cellulose, and also synthetic polyamide and polyurethane fibres, wool and silk. The materials mentioned are dyed or printed by the processes generally known for water-soluble reactive dyestuffs and customary in industry. They then give lightfast and wet fast brilliant dyeings and prints.

The temperatures in the examples are given in °C. The formulae of the water-soluble reactive dyestuffs in the description and in the examples are those of the free acids. The dyestuffs are in general isolated and used in the form of their alkali metal salts, in particular of the lithium salts, sodium salts or potassium salts.

The colour numbers given in the examples refer to the Colour Index hue indication chart (indicator numbers).

EXAMPLE 1

0.1 mol of the dyestuff of the formula

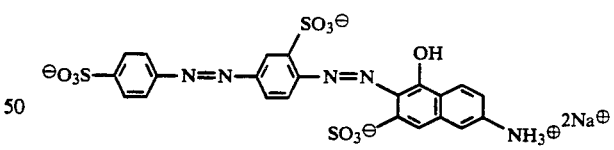

is stirred in 1 l of water and dissolved by addition of 0.1 mol of LiOH under neutral conditions. 500 g of ice are then added, and 13.5 g of trifluorotriazine are subsequently added dropwise, during which the hydrofluoric acid which is liberated is neutralized by LiOH solution. After the condensation is completed, 0.1 mol of N-methyltaurine in aqueous solution is run in. The exchange of the second fluorine atom takes place at a pH of 8.5-9 and at 0° to 5°, during which the hydrofluoric acid which is liberated is likewise neutralized by lithium hydroxide. The dyestuff is precipitated by salting out with 25% by volume of potassium chloride. It is filtered off with suction, dried and milled to give a red dyestuff powder which is readily soluble in water.

The dyestuff in the form of the free acid conforms to the formula

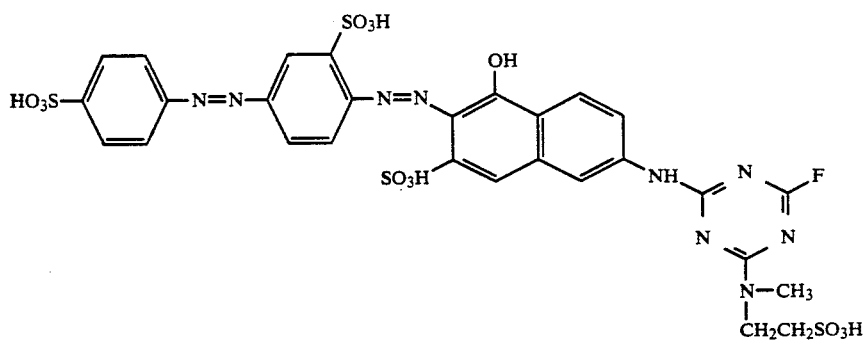

(1)

It dyes cotton in clear yellowish-red shades (colour number 7) by a process customary for reactive dystuffs.

If N-methyltaurine in this example is replaced by the amines mentioned in Table 1, readily water-soluble reactive dyestuffs, which produce yellowish-red dyeings on cotton, are likewise obtained.

TABLE 1

| Example | Amine |
|---|---|
| 1 | $H_2N-CH_2-CH_2-NHCO-CH_2-CH_2-COOH$ |
| 2 | Methylaminomethanesulphonic acid |
| 3 | Ethylaminomethanesulphonic acid |
| 4 | Taurine |
| 5 | Aminoacetic acid |
| 6 | Methylaminoacetic acid |
| 7 | Aminole sulphate = β-sulphatoethylamine |
| 8 | N-Methyl-N-β-sulphatoethylamine |
| 9 | β-Sulphatoethyl β'-aminoethyl sulphone |
| 10 | β-Sulphatoethyl-β'-sulphatoethylamine |
| 11 | β-Aminopropionic acid |
| 12 | δ-Aminobutanesulphonic acid |
| 13 | $H_2N-CH_2-CH_2-O-CH_2-CH_2-SO_2-CH_2-CH_2-OSO_3H$ |
| 14 | $H_2N-CH_2-CH_2-O-CH_2-CH_2-SO_2-CH_2-CH_2-Cl$ |

Likewise useful dyestuffs are obtained by starting from the aminodisazo dyestuff listed below and using the amines used in Example 1 and in Table 1 for the exchange of the second fluorine atom.

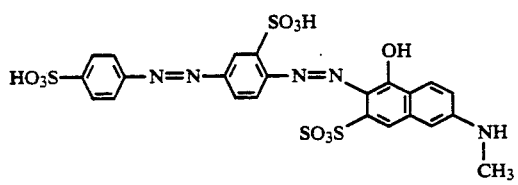

EXAMPLE 2

0.1 mol of the dyestuff of the formula

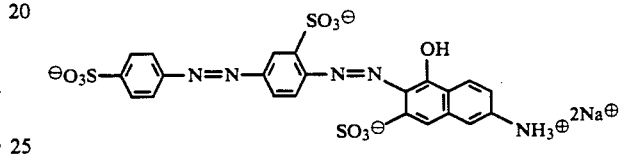

is stirred in 1 l of water and dissolved by addition of 0.1 mol of LiOH under neutral conditions. 500 g of ice are then added, and 13.5 g of trifluorotriazine are subsequently added dropwise, during which the hydrofluoric acid which is liberated is neutralized by LiOH solution. After the condensation is completed, 0.1 mol of m-sulphanilic acid in aqueous solution is run in. The exchange of the second fluorine atom takes place at a pH of 6–7 and at 0° to 15°, during which the hydrofluoric acid which is liberated is likewise neutralized by lithium hydroxide. The dyestuff is precipitated by salting out with 10% by volume of sodium chloride It is filtered off with suction, dried and milled to give a red dyestuff powder which is readily soluble in water.

The dyestuff in the form of the free acid conforms to the formula

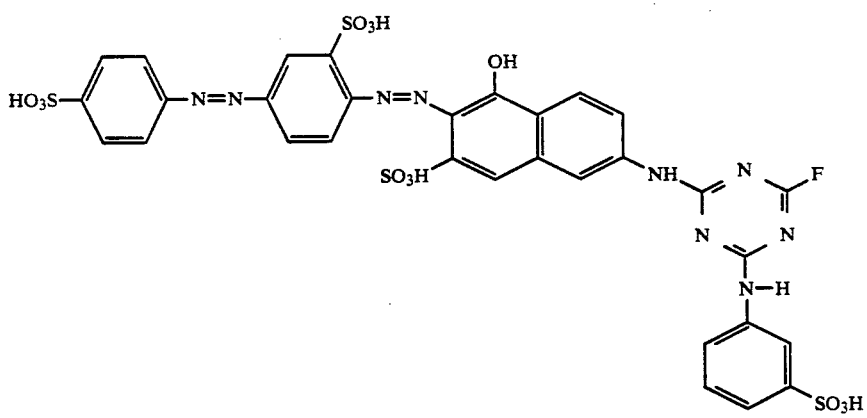

It dyes cotton in clear yellowish-red shades (colour number 7) by a process customary for reactive dyestuffs.

if m-sulphanilic acid in this example 2 is replaced by the amines mentioned in Table 2, readily water-soluble reactive dyestuffs, which produce yellowish-red dyeings on cotton, are likewise obtained.

TABLE 2

Amines of the formula

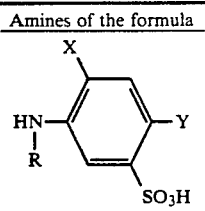

| Example | X | Y | R |
|---------|------|------|-----|
| 1 | H | Cl | H |
| 2 | H | CH₃ | H |
| 3 | H | OCH₃ | H |
| 4 | Cl | H | H |
| 5 | CH₃ | H | H |
| 6 | OCH₃ | H | H |
| 7 | H | H | CH₃ |
| 8 | SO₃ | H | H |

Useful dyestuffs are likewise obtained by starting from the aminodisazo dyestuff listed below and using the amines used in Example 2 and in Table 2 for the exchange of the second fluorine atom.

TABLE 1

| Example | Amine |
|---------|-------|
| 1 | H₂N—CH₂—CH₂—NHCO—CH₂—CH₂—COOH |
| 2 | Methylaminomethanesulphonic acid |
| 3 | Ethylaminomethanesulphonic acid |
| 4 | Taurine |
| 5 | Aminoacetic acid |
| 6 | Methylaminoacetic acid |
| 7 | Aminole sulphate = β-sulphatoethylamine |
| 8 | N-Methyl-N-β-sulphatoethylamine |
| 9 | β-Sulphatoethyl β'-aminoethyl sulphone |
| 10 | β-Sulphatoethyl-β'-sulphatoethylamine |
| 11 | β-Aminopropionic acid |
| 12 | δ-Aminobutanesulphonic acid |
| 13 | H₂N—CH₂—CH₂—O—CH₂—CH₂—SO₂—CH₂—CH₂—OSO₃H |
| 14 | H₂N—CH₂—CH₂—O—CH₂—CH₂—SO₂—CH₂—CH₂—Cl |

Shade on cotton yellowish-red (colour number 7).

EXAMPLE 3

0.1 mol of the dyestuff of the formula

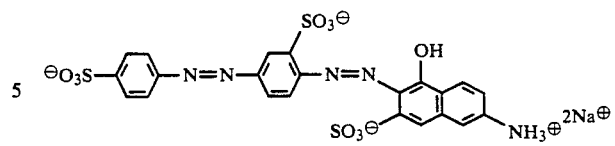

is stirred in 1 l of water and dissolved by addition of 0.1 mol of LiOH under neutral conditions. 500 g of ice are then added, and 13.5 g of trifluorotriazine are subsequently added dropwise, during which the hydrofluoric acid which is liberated is neutralized by LiOH solution. After the condensation is completed, 0.1 mol of 1-amino-3-phenyl β-sulphatoethyl sulphone in aqueous solution is run in. The exchange of the second fluorine atom takes place at a pH of 6-7 and at 0° to 15°, during which the hydrofluoric acid which is liberated is likewise neutralized by lithium hydroxide. The dyestuff is precipitated by salting out with 10% by volume of sodium chloride. It is filtered off with suction, dried and milled to give a red dyestuff powder which is readily soluble in water.

The dyestuff in the form of the free acid conforms to the formula

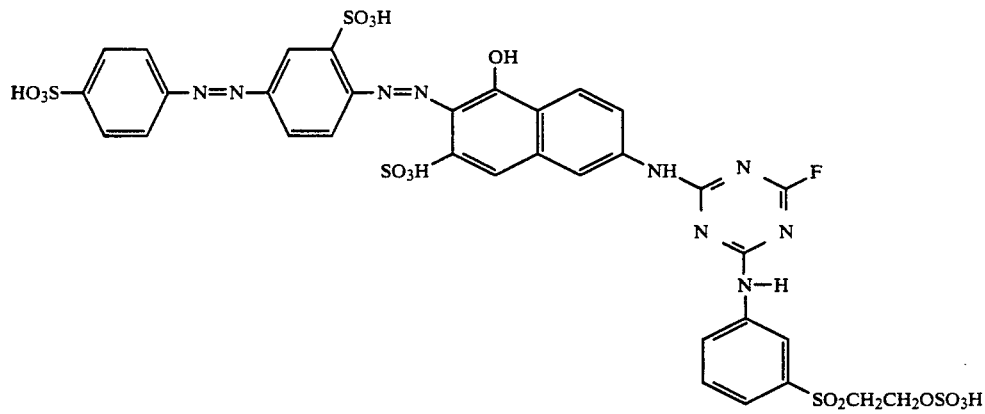

It dyes cotton in clear yellowish-red shades (colour number 7) by a process customary for reactive dystuffs.

If 1-amino-3-phenyl β-sulphatoethyl in Example 3 is replaced by the amines mentioned in Table 3, readily water-soluble reactive dyestuffs, which produce yellowish-red dyeings on cotton, are likewise obtained.

TABLE 3

| Example | Amine |
|---------|-------|
| 1 | 1-Amino-4-phenyl β-sulphatoethyl sulphone |
| 2 | 1-Amino-4-methyl-3-phenyl β-sulphatoethyl sulphone |
| 3 | 1-Amino-4-methoxy-3-phenyl β-sulphatoethyl sulphone |
| 4 | 1-Amino-3-phenyl β-phosphatoethyl sulphone |
| 5 | 1-Amino-2,5-dimethoxy-4-phenyl vinyl sulphone |
| 6 | 1-Amino-2-methyl-5-methoxy-4-phenyl β-sulphatoethyl sulphone |
| 7 | 1-Amino-3-phenyl vinyl sulphone |
| 8 | 2-Amino-8-sulpho-6-naphthyl β-sulphatoethyl sulphone |
| 9 | 2-Amino-6,8-di(β-sulphatoethylsulphonyl) naphthalene |
| 10 | 4-Ethylamino-3-(β-sulphatoethylsulphonyl) aniline |
| 11 | 4-N-(β-Sulphatoethyl)amino-3-(β-sulphatoethylsulphonyl)aniline |
| 12 | 4-N-(β-Sulphatsothyl)amino-3-(β-sulphatoethyl sulphonyl)aniline |
| 13 | 3-(β-Sulphatoethylsulphonyl)-1,4-diaminobenzene |
| 14 | 4-N-[β-(4'-Sulphophenyl)ethyl]amino-3-(β-sulphatoethylsulphonyl)aniline |
| 15 | 4-[N-Methyl-N-(β-sulphoethyl)]amino-3-(β- |

TABLE 3-continued

| Example | Amine |
|---|---|
| | sulphatoethylsulphonyl)aniline |

I claim:
1. A disazo dyestuff of the formula

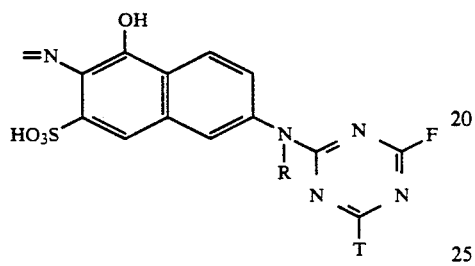  (1)

in which T is

in which
R$_3$ is —H, —C$_1$-C$_4$-alkyl or —X$_1$—Y
X$_1$ is a divalent aliphatic radical containing a maximum of 6 C atoms or a divalent aliphatic radical containing a maximum of 6 C atoms and containing —O—, —S—, or $$-\underset{\underset{R'}{|}}{N}-,$$

R$^1$ is H or C$_1$-C$_4$-alkyl
Y is —COOH, —SO$_3$H, —OSO$_3$H or —SO$_2$G
G is —CH=CH$_2$ or —CH$_2$—CH$_2$—Z
Z is a group which can be eliminated under alkaline conditions and
R is H or CH$_3$.
2. The dyestuff of claim 1, in which
Y is COOH, SO$_3$H or OSO$_3$H and
X$_1$ is —CH$_2$—, —CH$_2$CH$_2$—, $$-CH_2-\underset{\underset{CH_3}{|}}{CH}-.$$

3. The dyestuff from claim 1, in which
Y is SO$_2$G and
X$_1$ is —CH$_2$CH$_2$— or —CH$_2$CH$_2$—O—CH$_2$CH$_2$—.
4. A lithium salt of the formula

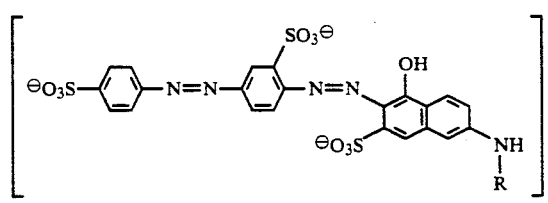

[Li$^\oplus_{0.5-3}$ M$^\oplus_{2.5-0}$]

in which M$^\oplus$ is Na$^\oplus$ or K$^\oplus$ and the sum of Li$^\oplus$+M$^\oplus$ is 3, R is H or CH$_3$, and wherein the cations M$^\oplus$ are identical or different.

* * * * *

UNITED STATES PATENT AND TRADEMARK OFFICE
CERTIFICATE OF CORRECTION

PATENT NO. : 5,075,428                                       Page 1 of 2
DATED     : December 24, 1991
INVENTOR(S) : Horst Jager It is certified that error appears in the above-identified patent and that said Letters Patent is hereby corrected as shown below:

Title page, Item [56], FOREIGN PATENT DOCUMENTS: After " 10669 " delete " of " and substitute -- 4/ --

Title page, Item [57], ABSTRACT: Line 4 delete " $Ch_3$ " and substitute -- $CH_3$ --

Col. 2, line 60     Delete " $CH_2OSO_3H.$ " and substitute -- $CH_2-CH_2OSO_3H.$ --.

Col. 5, lines 17-   Delete "
$$\begin{array}{ccc} \text{N-NH} & \text{H-N-CH}_3, & \text{H-NH} \\ | & | & | \\ \text{CH}_2\text{COOH} & \text{CH}_2\text{COOH} & \text{CH}_2\text{CH}_2\text{COOH} \end{array}$$
" and substitute --
$$\begin{array}{ccc} \text{H-NH} & \text{H-N-CH}_3, & \text{H-NH} \\ | & | & | \\ \text{CH}_2\text{COOH} & \text{CH}_2\text{COOH} & \text{CH}_2\text{CH}_2\text{COOH} \end{array}$$
--

Col. 11, line 24    Delete " TABLE 1 "

Col. 11, lines 51-63   Delete "

| Example | Amine |
|---|---|
| 1 | $H_2N-CH_2-CH_2-NHCO-CH_2-CH_2-COOH$ |
| 2 | Methylaminomethanesulphonic acid |
| 3 | Ethylaminomethanesulphonic acid |
| 4 | Taurine |
| 5 | Aminoacetic acid |
| 6 | Methylaminoacetic acid |
| 7 | Aminole sulphate =β sulphatoethylamine |
| 8 | N-Methyl-N-β sulphatoethylamine |
| 9 | β-Sulphatoethyl β'-aminoethyl sulphone |
| 10 | β-Sulphatoethyl-β'-sulphatoethylamine |
| 11 | β-Aminopropionic acid |
| 12 | δ-Aminobutanesulphonic acid |

UNITED STATES PATENT AND TRADEMARK OFFICE
CERTIFICATE OF CORRECTION

PATENT NO. : 5,075,428

DATED : December 24, 1991

INVENTOR(S) : Horst Jager

It is certified that error appears in the above-identified patent and that said Letters Patent is hereby corrected as shown below:

Col. 11, lines 51-63

Continued "

| Example | Amine |
|---|---|
| 13 | $H_2N-CH_2-CH_2-O-CH_2-CH_2-SO_2-CH_2-CH_2-OSO_3H$ |
| 14 | $H_2N-CH_2-CH_2-O-CH_2-CH_2-SO_2-CH_2-CH_2-Cl$ |

" and substitute

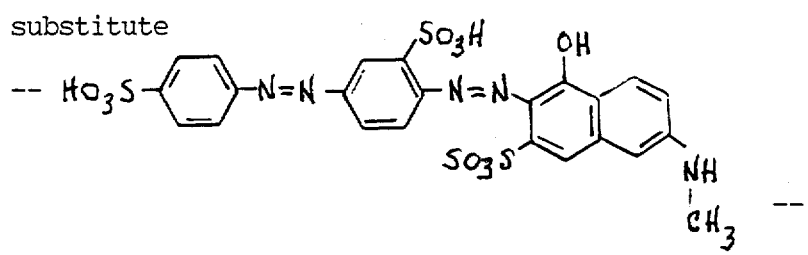

--

Signed and Sealed this

Twelfth Day of October, 1993

Attest:

BRUCE LEHMAN

Attesting Officer  Commissioner of Patents and Trademarks